United States Patent
Prorock (10) Patent No.: US 6,538,990 B1
(45) Date of Patent: Mar. 25, 2003

(54) METHOD AND SYSTEM FOR CONGESTION FLOW CONTROL IN A HIGH SPEED NETWORK

(75) Inventor: Thomas Joseph Prorock, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/292,465

(22) Filed: Apr. 15, 1999

(51) Int. Cl.[7] .......................... H04L 12/26; H04J 3/14; G08C 15/00; G06F 11/00; G01R 31/08
(52) U.S. Cl. .................. 370/229; 370/230; 370/395; 370/462; 709/226; 709/235
(58) Field of Search ................ 370/229, 230, 370/234, 235, 236, 410, 426, 462, 447, 401, 414, 395; 709/223, 224, 235, 253

(56) References Cited

U.S. PATENT DOCUMENTS

| | | | |
|---|---|---|---|
| 5,274,644 A | 12/1993 | Berger et al. ............... 370/95.1 |
| 5,276,681 A | 1/1994 | Tobagi et al. ............... 370/85.4 |
| 5,291,481 A * | 3/1994 | Doshi et al. ................. 370/230 |
| 5,345,447 A | 9/1994 | Noel ........................... 370/67 |
| 5,351,241 A | 9/1994 | Yehonatan .................. 370/85.3 |
| 5,404,353 A * | 4/1995 | Ben-Michael et al. ...... 370/235 |
| 5,434,860 A | 7/1995 | Riddle ......................... 370/84 |
| 5,491,801 A | 2/1996 | Jain et al. ............... 395/200.13 |
| 5,544,323 A | 8/1996 | Heaton et al. ......... 395/200.14 |
| 5,568,476 A * | 10/1996 | Sherer et al. ................ 370/236 |
| 6,035,333 A * | 3/2000 | Jeffries et al. .............. 709/224 |
| 6,049,528 A * | 4/2000 | Hendel et al. .............. 370/235 |
| 6,052,734 A * | 4/2000 | Ito et al. .................... 709/235 |
| 6,094,435 A * | 7/2000 | Hoffman et al. ............ 370/414 |
| 6,170,022 B1 * | 1/2001 | Linville et al. ............... 710/29 |
| 6,212,164 B1 * | 4/2001 | Murakami et al. ........... 370/230 |
| 6,230,870 B1 * | 11/2001 | Thaler ........................ 370/445 |
| 6,360,260 B1 * | 3/2002 | Compliment et al. ........ 709/224 |
| 6,370,114 B1 * | 4/2002 | Gullicksen et al. .......... 370/229 |
| 6,370,115 B1 * | 4/2002 | Smith ......................... 370/230 |

OTHER PUBLICATIONS

IBM Technical Disclosure Bulletin, vol. 38, No. 8, Aug. 1995, pp. 23–24.
IBM Technical Disclosure Bulletin, vol. 37, No. 3, Mar. 1994, pp. 591–594.
IBM Technical Disclosure Bulletin, vol. 38, No. 5, May 1995, pp. 75–78.

* cited by examiner

*Primary Examiner*—Huy D. Vu
*Assistant Examiner*—M. Phan
(74) *Attorney, Agent, or Firm*—Gerald R. Woods (57) ABSTRACT

A Fast Ethernet LAN hub may include a plurality of 100 Mbps ports, each dedicated to a single station or shared with a high speed Ethernet segment. The ports on the Fast Ethernet hub are connected to a low speed 10 Mbps LAN segment through a high speed LAN/low speed LAN bridge port. Because of the mismatch in data transmission rates, the LAN bridge may experience congestion as a result of data flow at the high speed/low speed interface. To minimize the impact on high speed ports, a congestion control system responds to a congested state by identifying 100 Mbps ports currently actively communicating with remote stations through the 10 Mbps port. Any 100 Mbps port identified as supporting a current connection to a network management station is excluded from the set of identified ports. The identified ports are temporarily prevented from sending or receiving data. Other 100 Mbps ports on the hub remain unaffected by the congestion control action.

2 Claims, 7 Drawing Sheets

METHOD AND SYSTEM FOR CONGESTION FLOW CONTROL IN A HIGH SPEED NETWORK

FIELD OF THE INVENTION

The present invention relates to computer networks, and more particularly, to a method and system for improving congestion flow control in such networks.

BACKGROUND OF THE INVENTION

Ethernet local area network (LAN) technology was developed as an inexpensive way to permit network stations to directly exchange data with one another on a peer-to-peer basis; that is, without routing the data through a host computer. The term "stations" is a generic one that applies to workstations, data storage servers, printer servers or virtually any other network-attached device capable of sending and receiving data. In a single Ethernet LAN, every station is connected to a shared bus and decides independently whether it can begin to transmit data to the shared bus.

An Ethernet station makes a transmit decision by applying an algorithm known as a carrier sense multiple access/collision detect (CSMA/CD) algorithm, defined in detail in a published IEEE 802.3 standard. In the simplest terms, an Ethernet station that has data to send on the shared bus attempts to "acquire" the bus by first monitoring or listening to the bus to see if it is currently busy (that is, one of the other stations is already transmitting data) or currently quiet (no other station is currently transmitting data). If the bus is busy, the station will wait for a predetermined period of time before again attempting to acquire it. If, however, the bus is quiet, the station initiates transmission of data. Even after initiating transmission, a station continues to listen to the bus.

Because every station attached to the shared bus acts independently in deciding when to transmit, there is a risk that two or more stations with data to transmit will each begin listening to the bus at substantially the same time, will each find the bus to be quiet and will each begin transmitting data at substantially the same time. Under these conditions, the data from the transmitting stations is said to "collide" on the bus, resulting in a garbled data stream. The data collision is detected when a transmitting station detects a mismatch between the data it is transmitting and the data actually being carried on the bus. When a collision is detected, the detecting station stops transmitting data and sends a jamming signal to the bus. The jamming signal is intended to assure that other transmitting stations will promptly detect a collision and will stop transmitting. Every station that detects a collision waits for a predetermined time before again invoking the CSMA/CD algorithm in an attempt to acquire the bus.

Is The original Ethernet technology (10 BaseT) supported a bus speed of 10 Mbps. Fast Ethernet (100 BaseT) is a more recent high speed local area network (LAN) technology that offers increased bandwidth to individual stations on the LAN by supporting a bus speed of 100 Mbps. Fast Ethernet uses the existing IEEE 802.3 CSMA/CD specification originally adopted for the 10 Mbps Ethernet technology while increasing the clock speed by a factor of ten. Consequently, 100 BaseT uses the same frame format, frame size and error detection mechanism as adopted for 10 Mbps systems.

Fast Ethernet hubs are network devices that provide a simple yet high performance solution to the bandwidth bottleneck of small and medium-sized legacy local area networks (LANs). Fast Ethernet hubs provide a number of 100 BaseT ports along with a port for connection to a 100 BaseT Ethernet network. 10 BaseT, AUI and coax port connections are provided for connection to the slower speed Ethernet network. Different manufacturers use different names for this port, including Fast Expansion Module (FEM), Network Interconnect Port or Network Expansion Module. In the remainder of this specification, the port will generally be referred to as a network interconnect (NI) port.

The network interconnect port acts as a LAN bridge between the high speed (100 Mbps) Ethernet network implemented in the hub and a low speed (10 Mbps) Ethernet network.

Congestion occurs on the LAN bridge when there is too much traffic that needs to be bridged from the 100 Mbps Ethernet to the slower 10 Mbps Ethernet. Different processes can be implemented to detect the presence of congestion at the hub. One well known process requires that the hub monitor the occupancy level of input buffer memories used to temporarily store data intended for the network interconnect port. The hub is said to be congested when the occupancy level of the buffer memories exceeds a predetermined percentage of their capacity.

To solve this congestion problem, a Fast Ethernet hub typically implements a feature called a back pressure function. Simply stated, the back pressure congestion control method requires that jamming signals be generated on the 100 Mbps side of the network to stop the transmission of any frames through the LAN bridge in an attempt to let the 10 Mbps side catch up with its frame processing. A jamming signal indicates that the network is busy to all of the stations on the fast Ethernet network. No stations can transmit or receive data while the jamming signal persists. The flow control mechanism of the back pressure function is a simple extension of the existing CSMA/CD contention algorithm.

There is a severe problem with this back pressure function. Every station on the 100 Mbps side of the network interconnect port is adversely affected if congestion occurs in the 10 Mbps network interconnect port since every 100 Mbps station will be prevented from transmitting or receiving as a result of the generated jamming signal. Since all stations experience a disruption when the back pressure algorithm generates the collisions, the existing back pressure solution is non-deterministic. No attempt is made to determine and isolate the 100 Mbps station or stations actually causing the congestion in the network interconnect port.

There is a need for an improved flow control mechanism that provides an improved contention algorithm suitable for a high speed LAN connection to a slower speed LAN.

SUMMARY OF THE INVENTION

The invention solves the problem of congestion that can arise at a high speed LAN/low speed LAN bridge. When congestion is detected at a hub port, a port to station address mapping is initiated to classify the station attached to a hub port. Each station is classified either as a local, a remote or a network management station (NMS). A remote station is one that is currently communicating with other stations on the low speed side of the LAN bridge. Remote stations are disabled during periods of LAN bridge congestion. Local stations, those that are not currently communicating with low speed stations over the LAN bridge, are not ordinarily disabled. Stations that are disabled is a result of a congestion condition are re-enabled after a predetermined period of time.

In accordance with a further aspect of the invention, ports on the managed hub that are connected to a network management station are protected by exempting those ports from any flow control action. This exemption, which assures continued availability of the network management station during most congestion situations, is justified by the fact that network management traffic is generally afforded a high priority. In accordance with another aspect of the invention, only stations making heavy use of the LAN bridge are disabled during periods of LAN bridge congestion.

BRIEF DESCRIPTION OF DRAWINGS

While the specification concludes with claims particularly pointing out and distinctly claiming that which is regarded as the present invention, details of preferred embodiments of the invention may be more readily ascertained from the following technical description, when read in conjunction with the accompanying drawings wherein:

DETAILED DESCRIPTION OF THE PREFERRED EMBODIMENT

Most current managed Ethernet hubs implement the following IETF standards: RFC 1516 "Ethernet Repeater Management Information Base" and RFC 1757 "Remote Network Monitoring Management Information Base", commonly referred to as the RMON MIB. A MIB or Management Information Base is a data structure that defines a series of variables that a network device must maintain and store in order to interact with a network management station. This invention assumes that these MIBs or similar MIB constructs are implemented in a managed device making use of the present invention. The preferred embodiment of this invention uses the SNMP (Simple Network Management Protocol) protocol, a prevalent network management protocol. It should be noted however, that the concepts in this invention related to network management could also be applied to other Network Management protocols such as CMIP or SNA.

The vast majority of network devices (hubs) ship with RMON (ReMote Network Monitoring Support). RMON provides a wealth of information about the health of the network as well as information about "conversations" between stations in a RMON Source to Destination Table. The invention, in a preferred embodiment, uses ARP (Address Resolution Protocol) which is part of the TCP/IP protocol suite.

Figure 1:
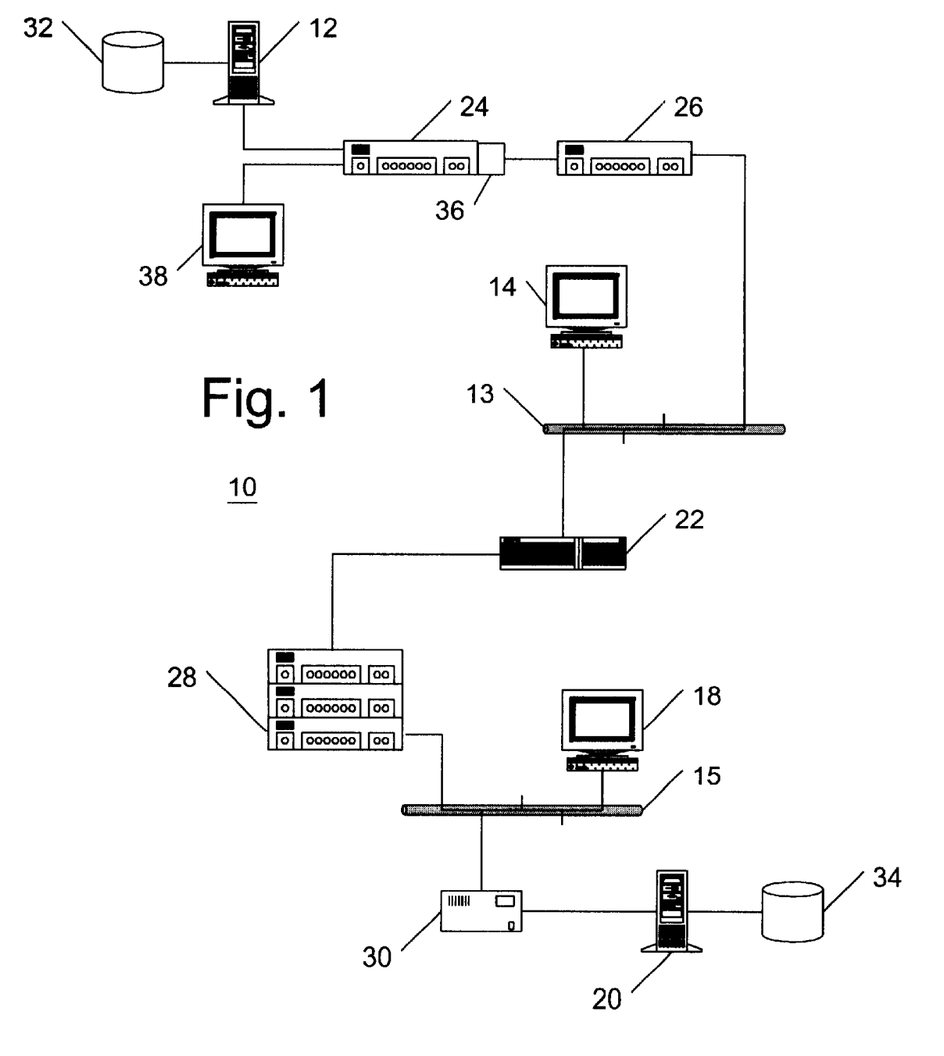
FIG. 1 is a block diagram of a computer network in which the present invention can be implemented.

FIG. 1 illustrates a typical computer network environment in which the present invention can be implemented. The network is a mix of high speed (100 Mbps) and low speed (10 Mbps) Ethernet elements. The high speed Ethernet component includes a Fast Ethernet hub 24 having a network management station 38 attached to one of its high speed ports. A file server 12 supporting a database 32 is shown as attached to another of the high speed ports on hub 24. Although not shown in FIG. 1, each of the high speed ports on the Fast Ethernet hub 24 would be capable of supporting a 100 Mpbs shared bus to which multiple Ethernet stations could be attached.

The low speed Ethernet components include 10 Mpbs Ethernet buses 13 and 15, interconnect devices such as router 22, Ethernet switch 30, 10 Mbps Ethernet hubs 26 and 28, workstations 14 and 18, file server 20 and database 34. The high speed and low speed subnetworks are connected (bridged) at a network interconnect port 36 in Fast Ethernet hub 24.

Figure 2:
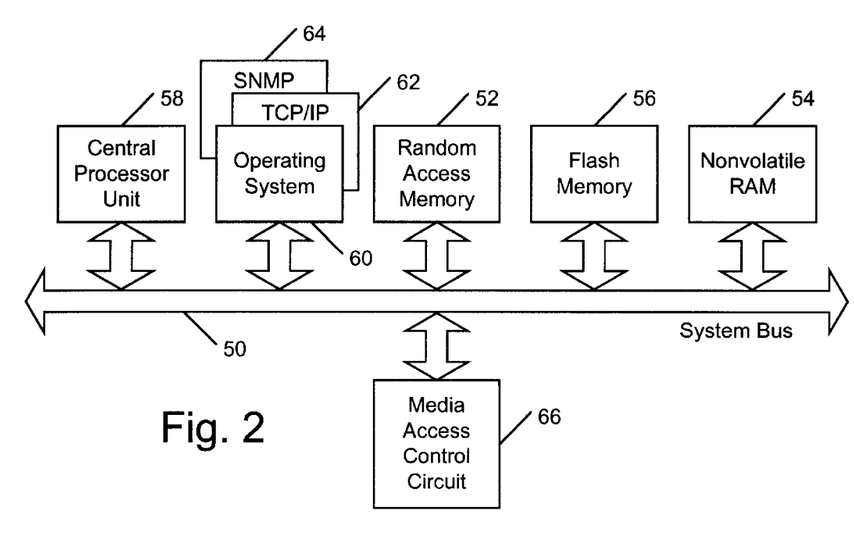
FIG. 2 is a component block diagram of an SNMP managed device.

The Ethernet hubs and other interconnect devices illustrated in FIG. 1 are typically managed devices in systems employing SNMP protocols. A representative component block diagram for an SNMP managed device is illustrated in FIG. 2. A typical managed device is an embedded system that includes a system bus 50, random access memory (RAM) 52, nonvolatile ram (NVRAM) 54 to store configuration information, semiconductor electrically programmable read only memory (FLASH EPROM) 56 to store operating system and boot-up code, a central processor unit (CPU) 58 to execute the code, and a media access control (MAC) chip 66 to provide the interface between the other components and the network 10. The software and microcode that executes in the device is shown as operating system code 60, TCP/IP protocol stack 62 and SNMP agent code 64. The code that implements this invention is included as a part of the operating system code (usually microcode) of the managed device. The MAC chip 66 copies received data frames into RAM 52 and notifies the processor 58, usually via an interrupt, that a frame is ready for processing. The operating system code 60 handles the interrupt and processes the frame.

Figure 3:
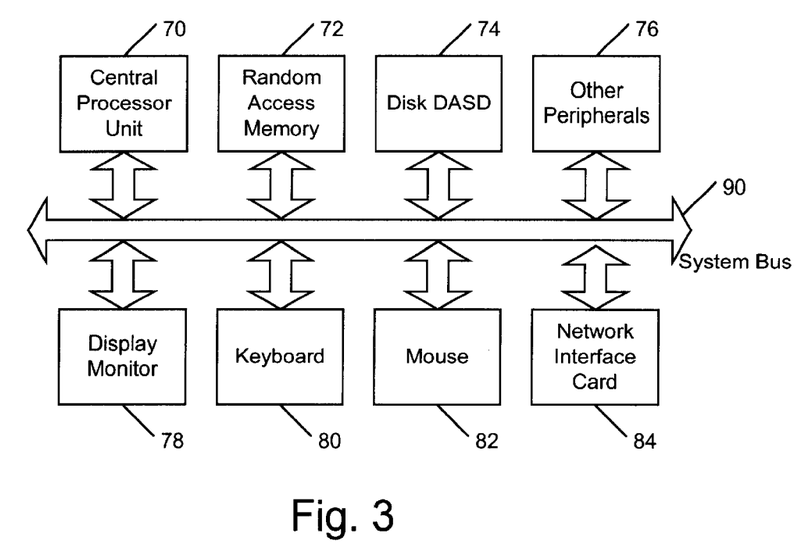
FIG. 3 is a component block diagram of a network management station.

FIG. 3 is a block diagram representation of a network management station (NMS) such as that indicated by reference numeral 38 in FIG. 1. The network management station includes a processor 70, with a system bus 90 to which RAM 72, direct access storage device (DASD) 74, other peripherals 76, display monitor 78, keyboard 80, mouse 82 and network interface card 84 are connected.

Figure 4:
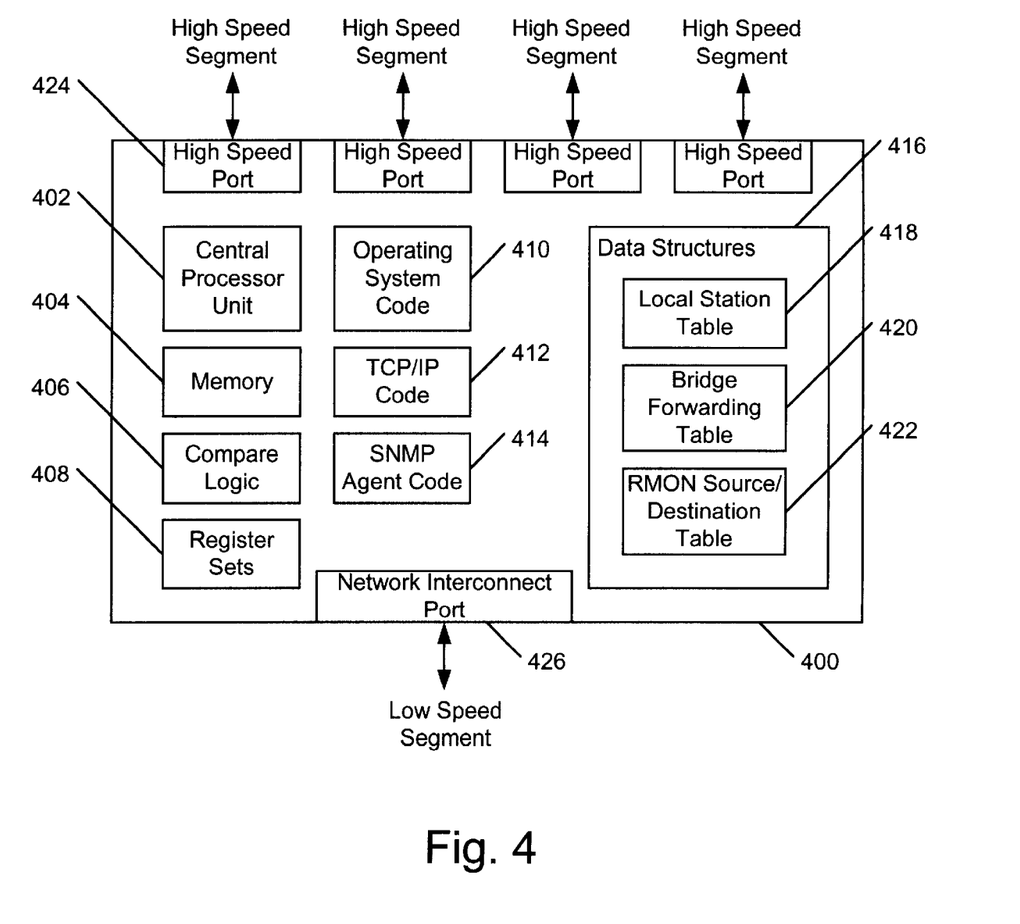
FIG. 4 is a block diagram of a Ethernet hub which can execute the processes required for implementation of the present invention

FIG. 4 is a block diagram of the essential elements of a LAN bridge 400 (or other network device) capable of implementing the present invention. As might be expected, the device 400 includes a central processor unit 402, memory 404, compare logic 406 (specific uses for which are described below), and a register set 408. The software resident on device 400 includes an operating system 410, TCP/IP code 412 and SNMP agent code 414, the latter because the device 400 is considered to be a managed device by network management devices. The device 400 also includes a number data structures 416 stored in some form of memory, such as RAM. The data structures include a Local Station Table 418, a Bridge Forwarding Table 420 and an RMON Source/Destination Table 422. The contents of each of these tables and the manner in which they are used in carrying out the present invention are discussed below.

The primary function of device 400 is to enable communications to be established between high speed or low speed devices connected to the device through either high speed ports, such as high speed port 424, or a low speed or network interconnect port 426.

Conventionally, network-attached devices are addressed using logical addresses which are assigned independently of the physical location of the devices in the network. Each managed hub must be capable of mapping these logical addresses to the physical port(s) on the network device. The mapping of logical addresses to physical ports is performed using the data structure previously identified as the Local Station Table or LST. A partial representation of a Local Station Table follows:

| Port Number | MAC Address | Station Class |
|---|---|---|
| 1 | A | Local |
| 2 | B | SML |
| 3 | C | Remote |

In many types of network applications, a physical port may have multiple associated logical addresses. In a preferred embodiment of the invention and for reasons which will become apparent later, each physical port of a hub implementing the invention is connected to a single physical device having a unique MAC address. In accordance with the invention, each station connected to a hub port is classified as a local, remote, or SML (Secure Management Link) station. A SML station is one that is connected to a device identified as a network management station. A remote station is one that is currently actively communicating with a station on the low speed side of the network interconnect port.

Every managed network device contains a table or list, commonly referred to as a Trap Receiver Table, identifying the network management stations that are managing the device. When a managed device detects an error condition, the device may generate a message (known in SNMP terminology as a trap or an alert) and send it to one or more of the network management stations identified in the Trap Receiver Table.

Network devices that forward packets/frames between physical subnetworks also maintain a table commonly referred to as a Bridge Forwarding Table. The Bridge Forwarding Table keeps a list of stations on other subnetworks (i.e., remote stations) and forwards packets addressed to these stations across the "bridge". The Bridge Forwarding Table serves as a filter which "passes through" only packets addressed to a station not included in the local subnetwork.

As noted above, the Local Station Table includes an entry for each station connected to a port on the device having the Local Station Table and that entry identifies the connected station as being local, remote, or SML. To implement congestion control in accordance with the invention, each station attached to the hub implementing the congestion control process must be assigned to one of these three classes of stations. The first step in the device classification process is to identify a MAC address for each device that is attached to a port of the bridge device. This is accomplished by examining the MIB variable in the Address Tracking Group of the Ethernet Repeater MIB (described in RFC 1516). The Address Tracking Group maps devices hub port numbers to the MAC addresses of stations or devices connected to those ports. This extracted information is stored locally in the hub in the Local Station Table (LST) described above.

The station classification field in the Local Station Table is initialized to a default value of local. The following operations resolve each entry in the Local Station Table to a classification of local, remote, or Secure Management Link (SML). A necessary step in classifying the attached stations is to determine whether the stations are communicating with locally attached stations (those attached to the Fast Ethernet hub 24) or remote stations (those stations on the other side of the network interconnect port 36). However, before that step is performed, each Secure Management Link to an attached network management station must first be identified. Secure Management Links can be identified statically or dynamically per methods described below.

Static Method of Identifying SML Links

Figure 5:
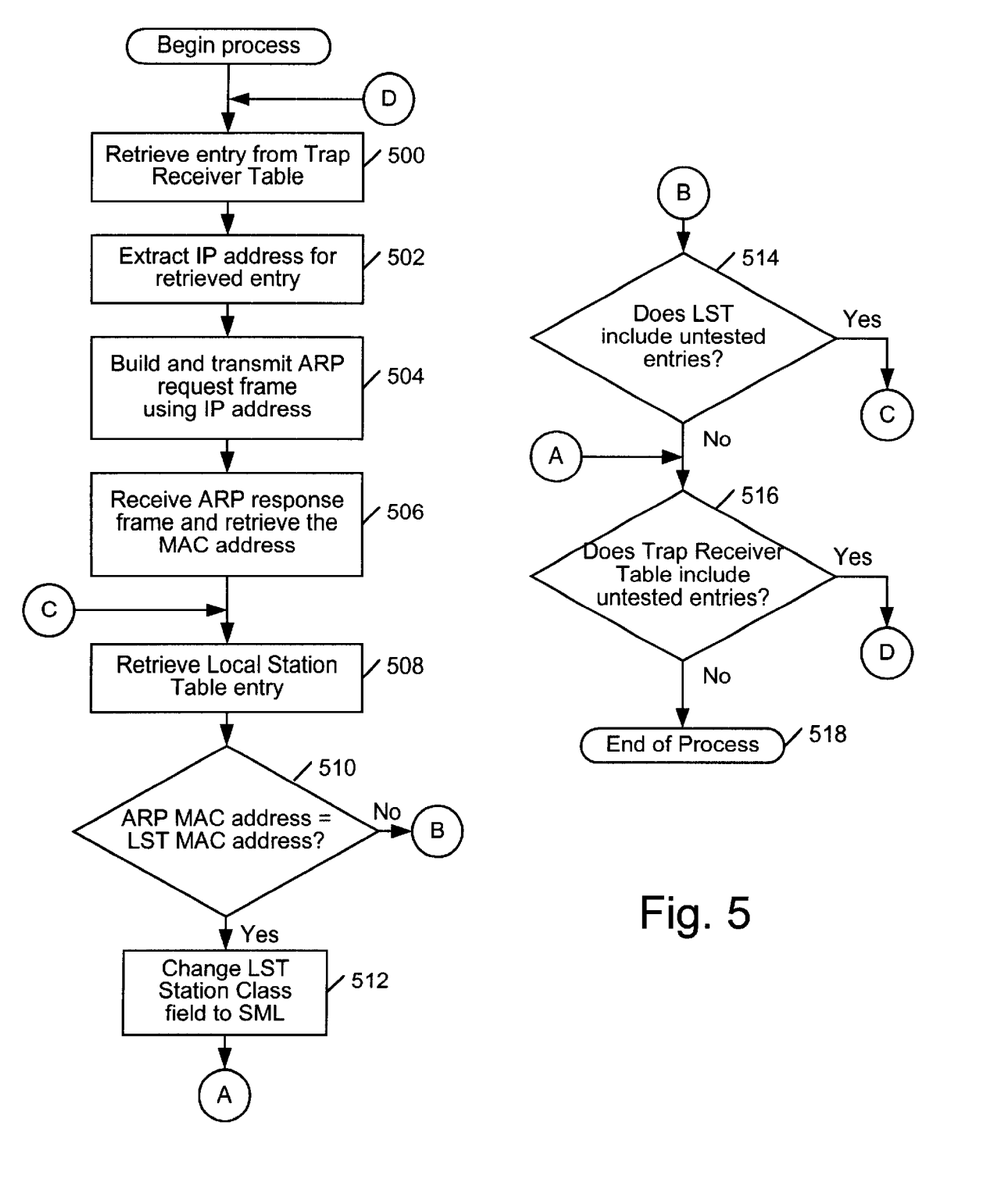
FIG. 5 is a flow chart of a preferred process for statically identifying a Secure Management Link.

As noted earlier, SNMP managed devices typically include a Trap Receiver Table that identifies the network management station(s) that will manage the device. The Trap Receiver Table is primarily used by the managed device to direct trap frames to the Internet Protocol (IP) addresses of these network management stations. The following pseudocode describes the process for identifying any SML associated with an entry in the Trap Receiver Table.

get the IP address of the network management station
    build and transmit an ARP address request frame including the IP address
    receive the ARP response frame and get the resolved MAC address
    find a matching entry for the resolved MAC address in the Local Station Table
    if there is a matching entry in the Local Station Table
        change the hub port classification to SML
    end
end FIG. 5 is a flow chart of the process that is executed in the bridge device for statically identifying Secure Management links. In step 500 a Trap Receiver Table entry is retrieved. The recorded IP address is extracted from the retrieved entry in step 502. Next, an ARP request frame targeted at the extracted IP address built and transmitted in step 504. In step 506, the ARP response frame is received and the MAC address associated with the IP address is extracted from the response frame. The retrieved MAC address is the resolved MAC address for the network management station identified by the retrieved entry from the Trap Receiver Table. An entry from the Local Storage Table is retrieved in step 508. Step 510 compares the MAC address from the ARP response frame to the MAC Address retrieved from the Local Storage Table. If a match is found, the station classification is changed to SML in step 512 to identify the port connection as a Secure Management Link. If no match is found, the default Local classification remains unchanged.

The process described above must be reiterated until a match is found or the resolved MAC address has been tested unsuccessfully against the MAC address of each station listed in the Local Station Table. Therefore, if step 510 does not reveal a match between the resolved MAC address and the retrieved Local Station Table MAC address, a check 514 is made to see whether the Local Station Table contains unprocessed entries. If such entries exist, the process loops back to step 508 so the matching address test can be repeated using the next MAC address in the Local Station Table.

Once an address match is found or every MAC address in the Local Station Table has been tested against the resolved MAC address, the process branches to a decision block 516 which determines whether every entry in the Trap Receiver Table has been processed. If the Trap Receiver Table includes unprocessed entries, the program loops back to step 500 to initiate the process for the next entry in the Trap Receiver Table. The entire process is concluded (step 518) when every entry in the Trap Receiver Table has been tested.

Dynamic Method of Identifying SML Links

Figure 6:
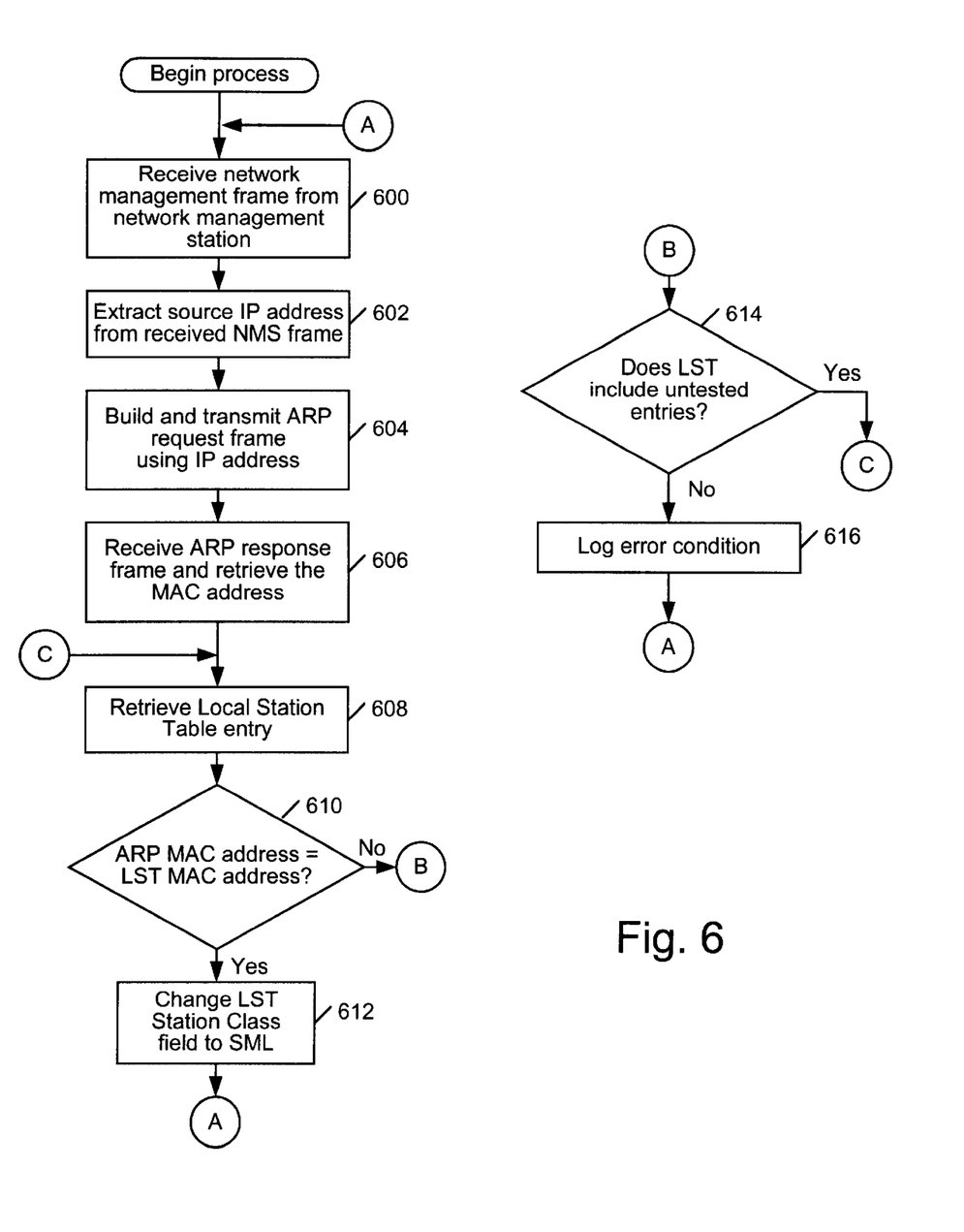
FIG. 6 is a flow chart of a preferred process for dynamically identifying a Secure Management Link.

The port(s) to which network management stations are attached can also be identified dynamically. The following pseudocode sequence is performed by the managed hub.

receive management frame and get the source IP address from the frame
build and transmit an ARP to get the MAC address corresponding to this IP address
receive the ARP response frame and get the resolved MAC address
find a matching entry for this MAC address in the Local Station Table
if there is a matching entry in the Local Station Table change this hub ports profile to SML
end FIG. 6 is a flow chart of the process that can be performed in the managed hub to dynamically identify Secure Management Links. The process is initiated in step 600 when the hub receives a management frame from a network management station. The hub, in addition to carrying out any other operations triggered by the management frame, retrieves the source (NMS) IP address from the management frame in step 602. The hub, in step 604, builds and transmits an ARP request frame targeting the retrieved IP address. When an ARP response frame is received, the MAC address associated with the IP address is extracted (step 606) from the frame, yielding a resolved MAC address for the frame source. An entry from the Local Station Table is retrieved for processing in step 608 and (in step 610), equality of resolved MAC address and the LST MAC address is tested. If the two MAC addresses are identical, the station classification field in the Local Station Table is amended (in step 612) to identify the link to the source as a SML link. With respect to this particular process, the system enters a "wait" state pending receipt of the next management frame.

If test 610 had revealed a mismatch between the compared MAC addresses, a further check 614 would be made to determine whether the Local Station Table had any station entries that should be processed. If check 614 reveals yet-to-be-processed station entries, the program loops back to operation 608 where the next Local Station Table entry is retrieved.

If check 614 reveals that every entry in the Local Station Table has been checked without finding a match between the resolved MAC address and a MAC address in the Table, an error condition must be logged (step 616). The error condition is a result of the fact that the process was triggered by a management frame which properly could have come only from a network management station. The failure to find a match between the resolved MAC address received in the ARP response frame indicates either that the network management station responsible for the management frame is improperly excluded in the Local Station Table or that there has been some failure in the SML identification process itself. The use made of any such error log is outside the scope of this invention.

Once the secure management links have been identified, the classification of remaining stations as either local or remote can be accomplished. This process requires some information stored at the network interconnect port. The network interconnect port has, in the form of the Bridge Forwarding Table, knowledge of all of the currently active MAC addresses on the 10 Mbps side of the network interconnect port. Network interconnect logic uses this information to make filtering/forwarding decisions on frames received at the network interconnect port from the 100 Mbps segment. The determination of the local/remote classifications also makes use of the Remote Network Monitoring (RMON) Matrix Source to Destination table that is implemented in the managed hub.

Simply stated, the local/remote station classification is established by checking each MAC address in the Local Station Table to determine whether the station having that MAC address is currently communicating with at least one of the stations identified in the Bridge Forwarding Table. The RMON Matrix Source to Destination table is used to determine if a correlation exists between the station addresses in the Local Station Table and the station addresses in the Bridge Forwarding Table. If a 100 Mbps station having one of the MAC addresses in the Local Station Table is communicating across the network interconnect port with a station identified in the Bridge Forwarding Table over a link not identified as a Secure Management Link, then the 100 Mbps station is classified as a remote station. By default any 100 Mbps station not currently communicating with a 10 Mbps station identified in the Bridge Forwarding Table and not previously classified as an SML station will retain the default "local" classification.

Figure 7:
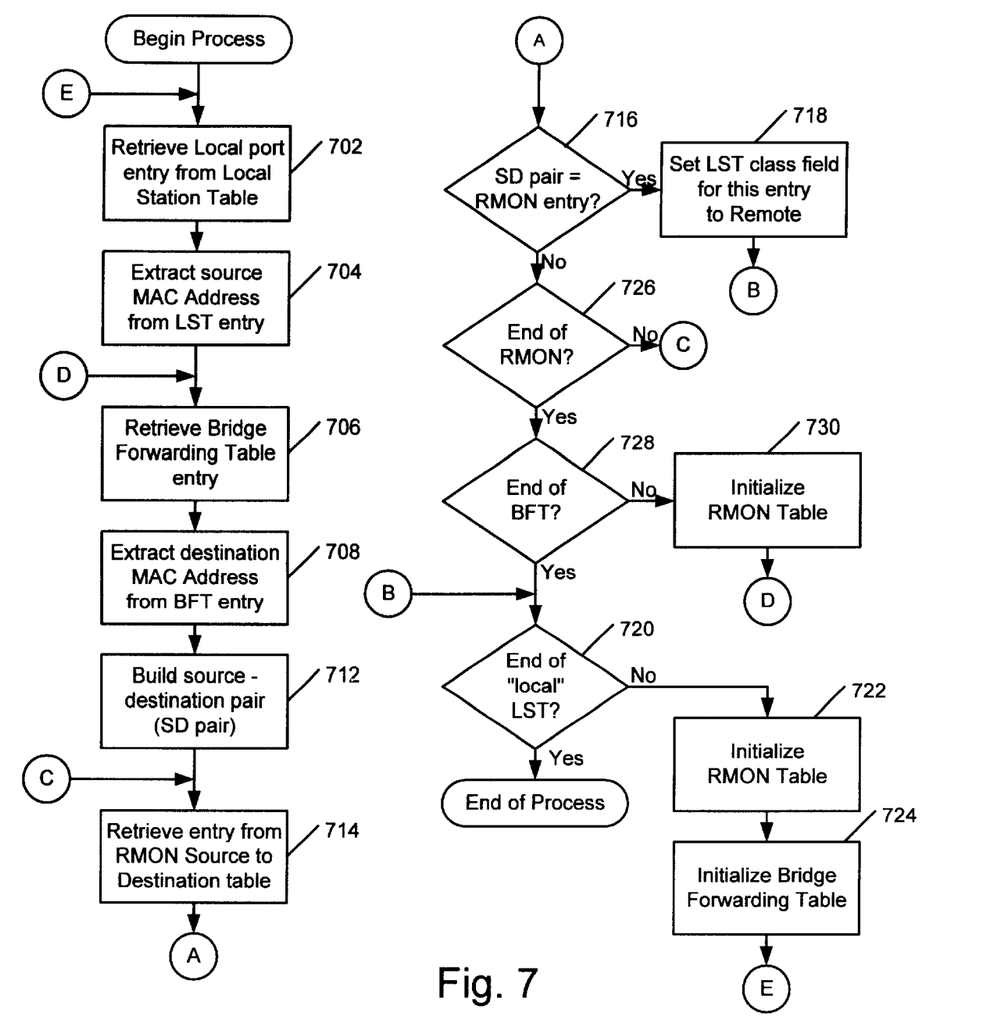
FIG. 7 is a flow chart of a preferred process for classifying port-attached stations as remote or local.

The following is pseudocode to determine the local/remote station classification.

for each entry in the LST
  get MAC address for this entry in the LST
  for each entry in the BFT
    get the mac address for this entry in the BFT
    form the index for the RMON Matrix Source to Destination Table
    search the RMON Matrix Source to Destination Table for an entry with this index
    if there is a matching entry AND the LST profile !=SML
      set LST profile for this mac address to remote
      break
    end
  end
end FIG. 7 is a flow chart of the steps that are performed in classifying a station as being either local or remote. A local port entry is retrieved from the Local Station Table in step 702. Any port that had previously been identified as a Secure Management Link is ignored in this retrieval operation. The MAC address is extracted from the retrieved entry in step 704. Next, an entry is retrieved from the Bridge Forwarding Table in step 706 and the destination MAC address contained in the entry is extracted in step 708. A source-destination pair or data structure is constructed from the source MAC address found in the Local Station Table entry and the destination MAC address found in the Bridge Forwarding Table in a step 712.

To determine whether communications are currently established between the source-destination pair, the pair must be compared to entries contained in the RMON source to destination table. In a step 714, an entry is retrieved from the RMON source to destination table. Step 716 is a compare of the source-destination pair and the RMON table entry. If a match is found in step 716, the classification field in the Local Station Table entry for this entry is set to remote in step 718 to indicate that the port (and attached station) are currently communicating with a station on the opposite side of the network interconnect port. Once the Local Station Table classification has been set, the program branches to an operation 720, which checks to see whether there are any additional local entries in the Local Station Table. If additional local entries exist, the RMON table is initialized in step 722. The Bridge Forwarding Table is then initialized in a step 724 before the program returns to the input of operation 702. If the comparison in operation 716 had not revealed a match between the source-destination pair and the RMON table entry, a further test 726 would have been made to determine whether there were additional unconsidered entries in the RMON table. If there were additional entries in the RMON table, the program would return to operation 714 to cause the next RMON table entry to be selected. The described steps would be repeated until a match was detected in operation 716 or every entry in the RMON table had been considered.

The series of steps described are required to test a single source-destination pair against the entries in the the RMON table. It is necessary to construct all possible combinations of source—destination pairs and to test those combinations against the entries in the RMON table. Therefore, if the end of the RMON table is reached in operation 726 without a match having been detected in operation 716, a test 728 is made to determine whether the last entry in the Bridge Forwarding Table has been accessed. If the last entry in the Bridge Forwarding Table is not been reached, the RMON table is initialized in step 730 and the program returns to the input of operation 706 in which the next entry in the Bridge Forwarding Table is retrieved. The newly retrieved entry is used to generate a new source-destination pair which can then be compared to the entries in the RMON table in accordance with the described steps.

When a given source MAC address has been paired with every destination address recorded in the Bridge Forwarding Table without detecting a match in the RMON table, test 720 is initiated. Test 720 determines whether there are other local entries in the Local Station Table; that is, additional source MAC addresses, which can be used to build more source-destination pairs. If test 720 shows that there are unused source MAC addresses in the Local Station Table, the RMON table is initialized in step 722. The Bridge Forwarding Table is subsequently initialized and step 724 before the program returns to the input of operation 702.

The entire sequence of steps described above must be performed for each possible source-destination pair built from the Local Station Table and the Bridge Forwarding Table until all high speed hub ports in the local class have been tested to see if they should be classified as remote ports. Once every port identified in the Local Station Table has been considered, as indicated by a positive result in test 720, the process ends.

The following brief example illustrates the relationships between the tables that are used in implementing a preferred embodiment of the invention. Assume that there is a 10 Mbps LAN with station addresses 1,2, and 3. This 10 Mbps LAN segment is connected to the network interconnect port on a Fast Ethernet hub. Attached to the Fast Ethernet hub ports 1–4 are station addresses 4, 5, 6, and 7. Station 4 is a file server communicating with station 1, station 5 communicates with file server station 7, and network management station 6 is communicates with each of the stations 1 through 5 and 7. The information in the following tables describes this example:

TABLE 1

BFT (Bridge Forwarding Table)

| Address |
|---|
| 1 |
| 2 |
| 3 |

TABLE 2

Matrix Source to Destination Table

| Source Address | | Destination Address |
|---|---|---|
| 4 | → | 5 |
| 4 | → | 1 |
| 5 | → | 7 |
| 6 | → | 1 |
| 6 | → | 2 |
| 6 | → | 3 |
| 6 | → | 4 |
| 6 | → | 5 |
| 6 | → | 7 |
| 7 | → | 5 |

TABLE 3

Local Station Table

| Port Number | MAC Address | Station Class |
|---|---|---|
| 1 | 4 | remote |
| 2 | 5 | local |
| 3 | 6 | SML |
| 4 | 7 | local |

The operations described above must all be performed as a prerequisite to execution of the actual flow control process, which is described below. Simply stated (and referring back to FIG. 1), when the network interconnect port 36 experiences congestion, the microcode (firmware) of the Fast Ethernet hub 24 autopartitions (disables) those ports connected to stations which are classified as remote stations in the Local Station Table stored in hub 24. As noted earlier, a remote station is a 100 Mbps network station (other than a network management station) currently communicating with a 10 Mbps station through the network interconnect port 36. Given that a 100 Mpbs station acting as a source will be supplying data to the Fast Ethernet hub at a rate ten times as fast as it can be accepted by a 10 Mbps station acting as a destination, it is assumed that each remote station is an active contributor to the congestion experienced in the Fast Ethernet hub. These ports connected to remote class stations remain disabled for a period of time to allow the congestion condition to be cleared before they are re-enabled.

The benefit of this flow control mechanism is that only those stations currently communicating over the network interconnect port 36 are affected during congestion conditions. All of the other stations attached to the Fast Ethernet hub 24 are unaffected.

The following pseudocode describes the sequence of events that occur when the network interconnect port 36 is congested:

for each entry in the Local Station Table
    get the station class
    if the station is identified as remote then disable the port associated with this station
end
end
set timer for the disable duration period
when timer pops, re-enable all remote stations The time period or length of time T for which any remote class station should remain disabled can be calculated as $$T = \frac{C * F_{avg}}{R}$$

where:
C is the capacity of the network interconnect port buffer;
$F_{avg}$ is the average size of frames, established as indicated below; and
R is that data rate on the low speed side of the network interconnect port.

Assuming a 1K (1024 bit) network interconnect port buffer, an average packet size of 128 bytes, and a 10 Mpbs LAN speed on the low speed side of the network interconnect buffer, applying the formula above would result in all 100 Mbps remote class stations being disabled for a period of time on the order of 1 millisecond.

The network interconnect port buffer capacity and the low speed LAN speed are fixed when the network is established. Once the network is established, the Fast Ethernet hub 24 can determine the average packet size by dividing the Network Interconnect OutOctets by the Network Interconnect OutFrames (, both of which are private MIB variables). Alternatively, an empirically determined fixed packet size (e.g., 64 bytes or 1518 bytes) can be substituted for the average packet size in the above algorithm.

Other factors could also optionally be built into the algorithm, e.g., the latency period for store and forward or cut through modes of frame forwarding over the network interconnect port. Also, a maximum port disable period may need to be established based on the protocols running on the network (e.g., most protocols timeout within 2 to 3 seconds).

Using Tables 1–3 above for the simple network described above, station 4 would be disabled when the network interconnect port experiences congestion. Communications between stations on the 100 Mbps side of the network interconnect port and communications with network management stations remain operational.

Figure 8:
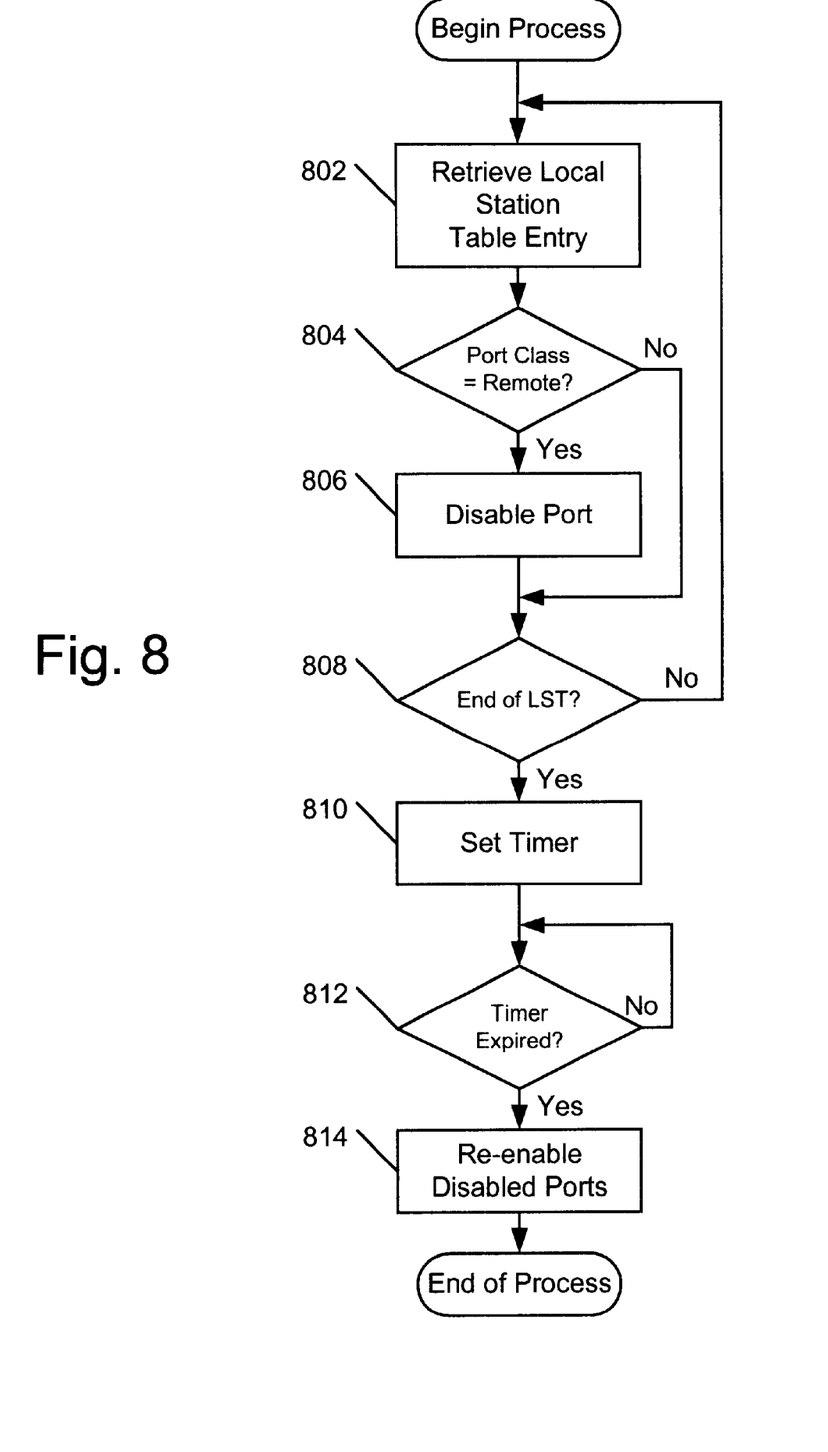
FIG. 8 is a flow chart of the congestion flow control process implemented in the LAN bridge.

FIG. 8 is a flow chart of the congestion control process which is implemented using the station classifications established as described above. It is assumed that congestion has been detected at the hub. The initial step 802 is to retrieve an entry from the Local Station Table. Step 804 is a test to determine whether the port (station) identified by the retrieved entry is classified as a remote port or station. If the port is classified as remote, meaning that it is currently communicating with a station on the low speed side of the network interconnect port, the high-speed port is disabled in step 806. If the station classification is local or secure management link, step 806 is bypassed. A test 808 determines whether every entry in the local station table has been retrieved and evaluated. The series of steps beginning with operation 802 and ending with operation 808 is repeated until the last entry has been retrieved from the local station table. When the last entry has been retrieved, all remote stations will have been identified and disabled. The hub then sets a timer in operation 810. The timer duration, as previously described, will be a function of the buffer capacity, the data rate in the low speed network and the average packet size, all as described previously. The process then enters a timing loop 812 which continues until the timer has expired. When the timer expires, the previously disabled ports are re-enabled in an operation 814.

The deterministic aspect of the invention can be enhanced even further by identifying the stations that are the heaviest users of the network interconnect port. By monitoring the stations classed as remote stations and calculating each such station's utilization of the port, the heavy users of the network interconnect port can be determined. It should be noted that the RMON Matrix Source to Destination contains counters for Octets and Packets sent from a Source MAC address to a Destination MAC address. This monitoring can be activated, for all remote class stations once all of the station classifications have been identified. Then only heavy users of the network interconnect port can be disabled during network interconnect port congestion, allowing other users communicating over the network interconnect port to continue communications without disruption.

Formulas to calculate utilization can be developed based on the RMON Matrix Octet counters. Other formulas can also be developed based on the RMON Matrix Packet counters. These MIB variables are fully described in RFC 1757. The packet counter formula can be based on the maximum number of 64 byte packets that can be transmitted on 10 mbps Ethernet; that is, 14.4K pps).

In summary, the invention described implements a deterministic solution to the problem of congestion flow control between 10 Mbps Ethernet and 100 Mbps Ethernet LAN segments. This deterministic method results in a solution that provides greater fairness to other workstations attached to the 100 Mbps Ethernet segment; specifically, local users are not effected by congestion on the network interconnect port.

While there has been described what is considered to be a preferred embodiment of the invention, variations and modifications will occur to those skilled in the art once they become acquainted with the invention. For example, while the preferred environment for the invention is a network utilizing Ethernet technology, the principles of the invention apply in any network environment where a communication interface exists between a high speed subnetwork and a lower speed subnetwork and basic congestion control is implemented by disabling stations in the high speed subnetwork upon detection of congestion at the communication interface. Such an environment can be implemented using networking technologies other than Ethernet. For example, the principles of the invention could be applied in networks having switched subnetworks or in a Token Ring environment.

Therefore, it is intended that the appended claims shall be construed to include the preferred embodiment and all such variations and modifications as fall within the true spirit and scope of the invention.

What is claimed is:

1. A method for controlling congestion in a data communication network device having at least one first port and a plurality of second ports, the data transmission rate at said first port being lower than the data transmission rate at any of said second ports, said method comprising the steps of:
    monitoring data flows at the first port to determine when the port has entered a congested state;
    identifying second ports currently communicating with the first port through the network device, said identifying step further comprising the steps of
    on a port-by-port basis, classifying each second port as being either in a first set of ports currently communicating with a network management station or in a second set of ports currently communicating with other of the second ports or a third set of ports currently communicating with the low speed port, and selecting only those ports in the third set of ports as the identified second ports;

causing the identified second ports to halt communications with the first port for at least a predetermined period of time; and enabling the identified second ports to resume communications with the first port at the end of the predetermined period of time.

2. A method as set forth in claim 1 wherein the classifying step further comprises the steps of:

comparing addresses of entries in a trap receiver table of network management stations with addresses of entries in a local station table of stations connected to the second ports to identify any second port currently communicating with a network management station;

adding each port identified in the preceding step to the first set of ports;

constructing source-destination address pairs by pairing each address entry in the local station table to an address in a bridge forwarding table of stations connected to the first port;

comparing each source-destination pair with an address pair retrieved from an RMON source to destination table of currently communication stations;

where a match is found between the source-destination pair and an RMON source-destination table entry, adding the second port associated with the local station table entry to the third set of ports.

* * * * *